United States Patent [19]

Wiesboeck

[11] 4,202,283
[45] May 13, 1980

[54] PROCESS AND APPARATUS FOR DISTRIBUTING COLD AMMONIA

[75] Inventor: Robert A. Wiesboeck, Stone Mountain, Ga.

[73] Assignee: United States Steel Corporation, Pittsburgh, Pa.

[21] Appl. No.: 786,302

[22] Filed: Apr. 11, 1977

[51] Int. Cl.² .............................................. A01C 23/02
[52] U.S. Cl. ............................................. 111/6; 111/7
[58] Field of Search ................... 111/6, 7; 62/51, 525, 62/512, 55; 239/565

[56] References Cited

U.S. PATENT DOCUMENTS

| | | | |
|---|---|---|---|
| 2,650,556 | 9/1953 | Turner | 111/7 |
| 2,857,863 | 10/1958 | Jessen | 111/7 |
| 3,139,848 | 7/1964 | Welty | 111/7 |
| 3,326,152 | 6/1967 | Frantzen | 111/7 |
| 3,413,940 | 12/1968 | Uissers | 111/7 |
| 3,978,681 | 9/1976 | Kjelgaard et al. | 111/7 X |
| 4,069,029 | 1/1978 | Hudson | 111/7 X |

FOREIGN PATENT DOCUMENTS

| | | | |
|---|---|---|---|
| 234637 | 6/1960 | Australia | 111/7 |
| 632011 | 12/1961 | Canada | 111/6 |
| 701082 | 1/1965 | Canada | 111/6 |
| 1371048 | 12/1964 | France | 111/7 |

*Primary Examiner*—Edgar S. Burr
*Assistant Examiner*—Steven A. Bratlie
*Attorney, Agent, or Firm*—W. Gary Goodson

[57] ABSTRACT

An initial stream of cold liquid ammonia at substantially ambient or atmospheric pressure is divided into a plurality of smaller streams by directing the initial stream downward against a substantially horizontal and substantially flat surface, the axis of the initial stream being substantially orthogonal to the plane of the flat surface. The cold liquid ammonia is preferably produced by directing pressurized liquid ammonia into an expansion chamber to produce a mixture of cold liquid and gaseous ammonia at substantially ambient or atmospheric pressure and then separating the cold liquid ammonia from the cold gaseous ammonia. The divided cold liquid ammonia is preferably applied by a plurality of spaced conduits to the soil where the cold, liquid ammonia is then covered by additional soil by means of a field cultivator to prevent loss of ammonia to the atmosphere.

25 Claims, 3 Drawing Figures

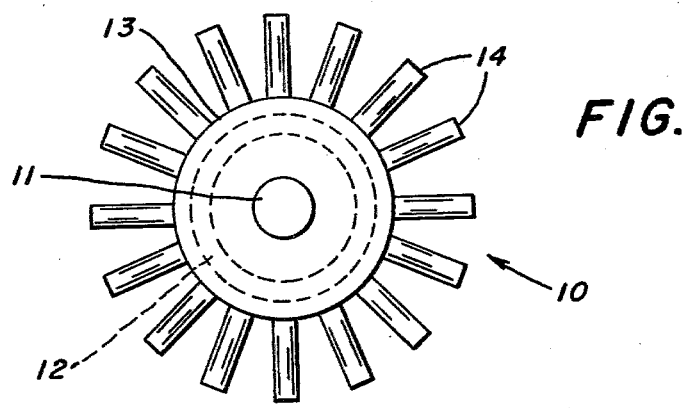
FIG. 1
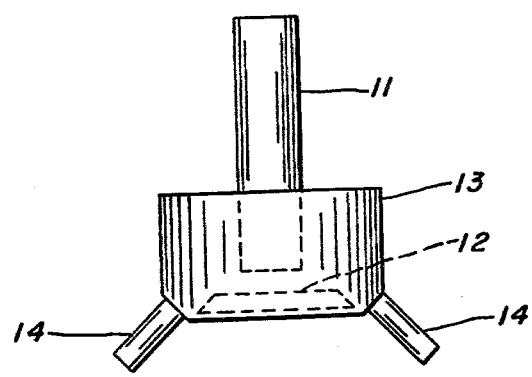
FIG. 2
FIG. 3
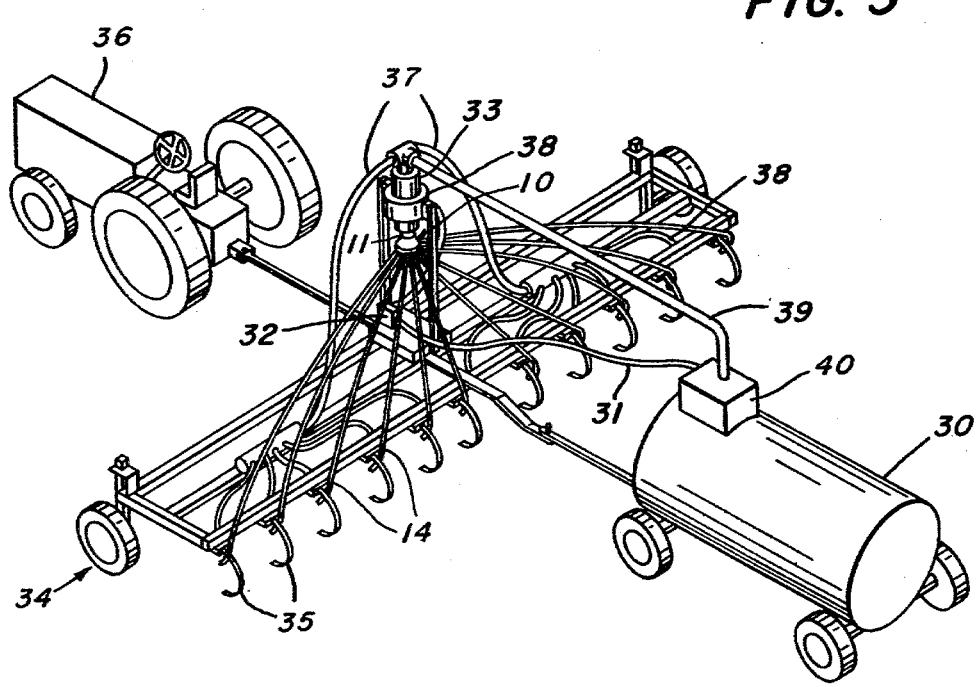

PROCESS AND APPARATUS FOR DISTRIBUTING COLD AMMONIA

FIELD OF THE INVENTION

This invention relates to the distribution of ammonia and preferably of anhydrous ammonia. One aspect of this invention relates to the distribution and utilization of ammonia as a soil fertilizer.

BACKGROUND OF THE INVENTION

Ammonia is applied to soils as a nitrogen fertilizer. The ammonia used for these purposes is usually stored in compressed form as a liquid at ambient temperature. Because of its vapor pressure, liquid ammonia at ambient storage is generally under a pressure of about 80 to about 200 psig. Conventionally, ammonia is applied to soils by injection through a series of socalled knives, which are pulled through the soil at a depth of about 6 to 15 inches. The ammonia is supplied from a pressure tank through a metering valve and discharged behind the tip of each knife. The pressure of the ammonia is released partly at the metering valve and partly at the knife end. Since the expansion of compressed ammonia occurs instantaneously, an intimate mixture of vapor and droplets form at the point of expansion.

Ammonia in the form of an aqueous solution has been applied to anerobically fermentable plant material for silage production to provide feed for ruminant animals, the applied ammonia being converted to nitrogen compounds providing nonprotein nitrogen (NPN) which is consumable by ruminant animals, as taught, for example, in U.S. Pat. No. 3,753,723, incorporated herein by reference. In field applications such as in soil fertilization and trench silage production, this method has serious disadvantages due to the necessity of carrying a separate water supply along with the ammonia and other field equipment. A more economical and simpler method of application of ammonia to soils and silage is described in U.S. Pat. No. 3,978,681 and in U.S. Pat. No. 4,069,029, each incorporated herein by reference, which disclose methods in which the pressure of the compressed, liquid ammonia is released prior to application in an expansion chamber which separates the gas from the liquid. Both phases are then applied to the soil or silage separately, thereby allowing a more uniform flow and a safer non-pressure application. An additional advantage of these methods is that they permit, in the case of soils, the application of ammonia with a conventional disc harrow or cultivator instead of a special knife applicator. Since the cold liquid and gaseous ammonia produced by these processes do not flash or sputter at substantially atmospheric pressure as easily as when pressurized liquid ammonia is applied to the soil directly in the prior art process, the cold ammonia can be applied to the top of the soil or at much shallower depths in combination with the field cultivator so that the cold ammonia thus applied is covered immediately by the soil turned over by the field cultivator. Thus a separate trip over the field to apply ammonia is eliminated. This results in fuel, labor, and machinery wear savings. Also eliminated is the need for knife maintenance and replacement costs.

The shortcoming of the apparatus and process for applying cold liquid ammonia at substantially ambient or atmospheric pressure is in the distribution of the initial stream of cold liquid ammonia leaving the pressure release chamber to a plurality of spaced streams for application to the soil or other use. Since the division of this initial liquid stream must be accomplished substantially in the absence of pressure the distribution problem is an especially difficult one. Gravity flow of this initial liquid stream to a notched weir or over an inverted cone were tried unsuccessfully. If one tries to operate the equipment to apply ammonia to the soil on a field cultivator on somewhat hilly land which results in tilting the equipment then erratic, non-uniform distribution usually results. This lack of control of ammonia distribution is a particularly severe problem when it becomes necessary to vary the ammonia flow rate by a factor of between about 1 to 15 which is a common requirement for application of ammonia to the soil using the different sizes of field cultivators available. The term "field cultivator" is used herein to mean a plow, disc, cultivator, harrow or other suitable soil tillage equipment capable of turning the soil sufficiently to allow ammonia applied to the soil in front of the equipment to be covered to prevent significant immediate loss of ammonia.

BRIEF DESCRIPTION OF THE INVENTION AND FIGURES

This invention relates to a method and apparatus for distributing cold liquid ammonia at substantially ambient or atmospheric pressure by directing an initial stream of the ammonia downward against a substantially flat surface, the plane of the flat surface being positioned in a generally horizontal direction and at a substantially orthogonal direction relative to the axis of the initial ammonia stream to produce a controlled flow of ammonia on the flat surface and then dividing the initial stream into a plurality of smaller streams. The initial stream of ammonia is carried downward in an initial conduit in a substantially vertical direction into an enclosed chamber containing the flat surface. The distance between the end of the initial conduit closest to the flat surface and the shape of this end of the initial conduit are such that a controlled flow of liquid ammonia, and preferably a uniform flow, is obtained on the flat surface such that a controlled division of the liquid ammonia is accomplished even when the position of the flat surface is varied from the horizontal. The smaller streams of ammonia pass through a plurality of spaced conduits, preferably for application of the ammonia to the soil. Preferably the apparatus for distributing the liquid ammonia is mounted on or near a field cultivator such that as the ammonia is applied to the soil from the end of a secondary conduit, this ammonia is immediately covered with soil to prevent loss of the ammonia. Preferably the initial stream of cold liquid ammonia is produced by expanding pressurized liquid ammonia in an expansion chamber to form a mixture of cold liquid and gaseous ammonia and then separating the cold liquid ammonia from the cold gaseous ammonia. The initial conduit preferably has a vertical length of at least about six inches in order to cause a splashing effect when the initial stream of ammonia strikes the flat surface to thereby uniformly distribute the stream on the flat surface.

This invention provides controlled distribution of cold liquid ammonia at substantially ambient or atmospheric pressure even when used on a field cultivator used on hilly land. Furthermore, the apparatus of this invention is simple and rugged and can be utilized effectively for flow rates varying by a factor of between about 1 and about 15.

FIG. 1 represents a top view of the distributor apparatus of this invention.

FIG. 2 represents a side view of the distributor apparatus of this invention. FIG. 3 schematically represents an embodiment of the invention wherein cold anhydrous ammonia is applied to the soil for fertilization.

PREFERRED EMBODIMENT(S)

The ammonia useful in this invention is preferably anhydrous ammonia. However, the term includes ammonia containing other materials, preferably in minor amounts, such as water, insecticides, fungicides, nitrapyrin, plant nutrients, or any other material that does not adversely affect the operation of the process. These other materials may be part of the ammonia in the pressurized tank of ammonia or may be added in the expansion chamber or at another suitable point in the process of this invention.

The initial conduit for the initial cold liquid ammonia stream is preferably a closed cylindrical conduit. This initial conduit preferably has a minimum length and direction to provide minimum free fall velocity to provide controlled flow on the flat surface and ability to function even when the entire apparatus is tilted. Preferably the initial conduit has a vertical free fall of at least about six inches. This initial conduit has a minimum diameter corresponding with the desired flow range. To assure uniform distribution in the pipe it is desirable that the conduit size be as small as possible for carrying desired flow of ammonia. Vortex breakers, baffles or the like may be used to obtain the desired uniform initial stream flow at the point where the initial stream contacts the flat surface.

The end of the initial conduit adjacent to the flat surface is cut to maintain the desired flow of ammonia. Preferably with a thick-walled initial conduit this end of the conduit is cut true and beveled on the outside to a minimum angle of 45°. If a thin-walled conduit is used at this end of the conduit a clean perpendicular cut is adequate.

The enclosed chamber which encloses the flat surface and the end of the initial conduit adjacent to the flat surface is kept at a size to accommodate the secondary conduits and preferably of a sufficiently small size to minimize the effect of tilting the entire apparatus. The base of this chamber may act as the flat surface or the flat surface may be a separate surface within the chamber.

The flat surface that forms the splash plate for the initial cold liquid ammonia stream is a surface which is "substantially flat". The term "substantially flat" is intended to include curved, rippled or other surfaces which generally act as a splash plate to change the direction of the initial stream from a substantially vertical downward direction to a substantially horizontal direction. After the direction of the liquid has been changed it is permissible to have a sloping surface, channels or the like which leads to the secondary conduits and assists in the division of the liquid. Preferably, the flat surface of the splash plate is at least the size and location to provide contact with the entire initial stream of ammonia.

The distance between the end of the initial conduit closest to the flat surface and the flat surface is a distance which will help to cause flow of liquid ammonia in different directions on the flat surface. Preferably this distance is such that the cross-sectional area of the initial stream at the end of the initial conduit closest to the flat surface is approximately equal to the area of the outer surface of a conduit which would be formed by extending the initial conduit to the flat surface. Thus a square initial conduit having a cross-sectional area of one square inch would preferably be located so that the end of this conduit is about ¼ inch from the flat surface. If desired the distance of the flat surface to the end of the initial conduit may be adjustable to achieve this preferred distance as the flow rate is varied. However, for simplicity it may be desirable to simply fix this distance for the maximum flow rate expected to be used. Preferably the distance between this end of the initial conduit and the flat surface is equal to about ⅛ to about ½ of the diameter of the initial conduit.

The flow rate may be varied over a wide range and preferably between about one and about 15 gallons per minute and more preferably between about two and about eight gallons per minute. At these preferred flow rates an average diameter of the initial conduit is between about ½ and two inches and the preferred distance between the end of the initial conduit closest to the flat surface and the flat surface is between about ⅛ inch and about ½ inch. An average diameter for the initial conduit of about one inch is most preferred and a distance of about ¼ inch between this end of the conduit and the flat surface is most preferred.

The flat surface is located in a substantially horizontal plane and is located in a substantially orthogonal direction relative to the axis of the initial stream of ammonia. If there are more than about 20 secondary conduits it is desirable that the flat surface be elevated at least about ¼ inch above the openings of these secondary conduits to provide a drop-off toward these openings. This feature avoids interference of the liquid at the periphery of the chamber with the liquid discharging from the splash plate.

FIG. 1 shows a top view of the distributor apparatus 10 of this invention. A cross-sectional view of the initial conduit 11 shows how the initial liquid stream would be brought into contact with the center of the flat surface of splash plate 12 which is in an elevated position from the base of the enclosed chamber 13. The liquid ammonia on the flat surface is then divided among the spaced secondary conduits 14.

FIG. 2 is a side view of the distributor apparatus 10 of FIG. 1. The initial conduit 11 having a vertical axis carries an initial stream of cold liquid ammonia at substantially ambient or atmospheric pressure downward to achieve a liquid velocity equivalent to that achieved by a vertical free fall flow of at least about six inches. The initial stream of ammonia then strikes the flat surface of the splash plate 12 which is in an elevated position from the base of the enclosed chamber 13. The liquid layer on the flat surface then flows through the plurality of secondary conduits 14 where the liquid ammonia can then be applied in a spaced arrangement to the soil or other suitable material to be treated.

FIG. 3 of the drawings illustrates the application of cold ammonia to the soil. The field cultivator 34 has attached thereto an expansion chamber 33 of the type described for producing an initial stream of cold liquid ammonia. Ammonia is supplied from pressure tank 30 through conduit 31 to expansion chamber 33. The pressurized liquid ammonia leaves tank 30 through adjustable control valve 32 and the conduit 31 and enters expansion chamber 33. The conduit 31 enters the expansion chamber 33 at an inlet 38 about midway up the vertical side of the expansion chamber. The pressurized liquid ammonia enters the expansion chamber 33 to form a mixture of cold liquid and cold gaseous ammonia. The cold liquid ammonia is then separated from the cold gaseous ammonia in the expansion chamber 33. An initial cold liquid ammonia stream at substantially atmospheric or ambient pressure leaves the bottom of the expansion chamber through initial conduit 11 and then into distributor apparatus 10 where the initial stream is divided into a plurality of smaller ammonia streams carried by a plurality of secondary conduits 14 to spaced positions along the field cultivator 34 and located adjacent to a field cultivator blade 35 such that the ammonia applied to the soil by the secondary conduit is immediately covered by soil by the action of the field cultivator being moved across the field by the tractor 36. The liquid ammonia may be applied to the top of the soil or by shallow blades just below the surface of the soil. About 15 to about 25% of the pressurized liquid ammonia from the pressure tank is converted to gaseous ammonia in the expansion chamber 33. This gaseous ammonia may be delivered to the field through conduit 37 which is positioned on the cultivator such that the ends 38 are below the soil, preferably about two to three inches below the surface of the soil. On the other hand, the cold gaseous ammonia can be recycled through conduit 39 to compressor 40 which compresses the gaseous ammonia to form liquid ammonia and redeliver it to the pressure tank 30 for reuse.

The following examples are given by way of illustration:

EXAMPLE I

A distributor apparatus of the type shown in FIGS. 1 and 2 was equipped with a one-inch cylindrical initial conduit 10, extending to within 0.26 inch from the flat surface of the splash plate 11 and 16 secondary conduits (¼ inch ID) set at a 30° angle from horizontal. The bottom of the enclosed chamber 12 was used as the splash plate. All secondary conduits also included ⅜ inch ID hoses. Eight alternate hoses of the sixteen hoses were directed to containers to collect and weigh the amount of water flowing through each outlet. The distribution at various flow rates for the eight measured outlets is shown below:

| Initial Conduit, gpm | Flow Rate Secondary Conduits, Deviation from Average, % | | | | | | | |
|---|---|---|---|---|---|---|---|---|
| 1.30 | −16.5 | +8.3 | +11.8 | +16.1 | −9.2 | −10.8 | +0.5 | 0 |
| 2.75 | −15.0 | +9.1 | +15.1 | +12.1 | 0 | −6.1 | −6.1 | −9.1 |
| 4.13 | −8.0 | +1.1 | −1.9 | +19.5 | +10.4 | −1.8 | −8.0 | −11.0 |
| 5.50 | −9.4 | −2.7 | +7.4 | +20.8 | +4.0 | −6.2 | −6.2 | −6.2 |
| 6.88 | −5.8 | +0.4 | −0.4 | +3.6 | +13.0 | −5.8 | −5.8 | +0.4 |

For the next series of measurements, the distributor apparatus was tilted to 10° off horizontal and the determination repeated at the same flow rates.

| Initial Conduit, gpm | Flow Rate Secondary Conduits, Deviation from Average, % | | | | | | | |
|---|---|---|---|---|---|---|---|---|
| 1.30 | −31.7 | −12.9 | +11.4 | +18.4 | +12.8 | +17.0 | +5.2 | |
| 2.75 | −41.0 | +1.4 | +6.5 | +12.2 | +22.3 | +8.6 | +2.9 | |
| 4.13 | −35.5 | −3.2 | −11.3 | +21.0 | +12.9 | +1.5 | +29.0 | |
| 5.50 | +1.4 | +13.0 | −5.1 | +17.4 | +2.8 | +12.3 | +2.8 | |
| 6.88 | +27.6 | −11.3 | +6.4 | −2.8 | −7.8 | −4.2 | −4.2 | |

EXAMPLE II

A distributor apparatus of the design shown in FIGS. 1 and 2 was equipped with a one-inch inlet pipe at the center as the initial conduit 10 extending to within 0.26 inch from the splash plate 11 and 24 outlet pipes as the secondary conduits (¼ inch ID) set at a 45° angle from horizontal. The inside diameter of the chamber 12 was 5.5 inch. The distributor apparatus was equipped with a splash plate 11 4.5-inch diameter, 0.25-inch thick, and beveled at 45° as shown in FIGS. 1 and 2. To measure the performance of the distributor, the discharge from 8 of the 24 outlet hoses which formed part of the secondary conduits 13 was collected in containers and weighed periodically. The eight collection points were rotated from run to run to measure all 24 outlets. A typical result of the measurements is listed below:

| Initial Conduit, gpm | Flow Rate Secondary Circuit, Deviation from Average, % | | | | | | | |
|---|---|---|---|---|---|---|---|---|
| 3.37 | −8.2 | +7.5 | −1.6 | −1.6 | −1.6 | +14.7 | −10.7 | +1.6 |
| 5.62 | −2.0 | −5.1 | −5.1 | +1.2 | −11.4 | +13.8 | +13.9 | −5.1 |
| 7.82 | −2.0 | −11.4 | +4.4 | +4.4 | −8.3 | +4.4 | +13.8 | −5.1 |
| 10.12 | −8.7 | −5.5 | +7.1 | +7.1 | −8.7 | −2.4 | +13.4 | −5.5 |

The sensitivity to tilting was measured by mounting the distributor apparatus at an angle of 8° from horizontal and repeating the preceding measurement.

| Initial Conduit, gpm | Flow Rate Secondary Conduit, Deviation from Average, % | | | | | | | |
|---|---|---|---|---|---|---|---|---|
| 3.37 | −5.8 | +12.2 | +6.7 | +13.1 | +8.2 | +2.1 | −18.9 | −17.7 |
| 5.62 | −4.1 | +8.1 | +6.9 | +14.9 | +6.2 | −1.8 | −16.2 | −13.9 |
| 7.82 | +2.7 | +5.6 | +9.1 | +10.1 | −1.2 | +2.9 | −11.7 | −17.5 |
| 10.12 | −5.9 | +10.1 | +2.2 | +7.9 | −6.3 | +5.6 | −1.6 | −12.1 |

These examples show that important advantages of the disclosed distributor apparatus are its capability to provide a relatively uniform distribution of a gravity-fed liquid independent of level mounting of the device. Additional important features are the simplicity of design and absence of moving parts that is possible with the apparatus of this invention.

I claim:

1. A process of distributing cold liquid ammonia substantially free of gaseous ammonia at substantially ambient or atmospheric pressure comprising (1) directing an initial stream of the liquid ammonia downward by gravity flow against a splash plate having a flat surface, the plane of the flat surface being positioned in a generally horizontal direction and at a substantially orthogonal direction relative to the axis of the initial ammonia stream, the stream making contact with the flat surface within an enclosed chamber and in a manner such that a flow of liquid is formed on the flat surface to achieve effective distribution when tilting the flat surface by up to about 10 degrees from the horizontal position while maintaining the direction of the axis of the stream relative to the plane of the flat surface substantially constant, and (2) passing the liquid ammonia from the flat surface to a plurality of outlets to thereby cause a division of the cold, liquid ammonia, wherein the axis of the initial stream of cold liquid ammonia is essentially vertical and wherein the length of the vertical stream is at least about 6 inches, and wherein the initial cold liquid ammonia stream is carried by a cylindrical conduit and the end of such conduit is in a plane essentially parallel to the plane of the flat surface and wherein the distance between the end of the cylindrical conduit and the flat surface is equal to between about ⅛ to about ½ of the average diameter of the cylindrical conduit.

2. Process as in claim 1 wherein the cold liquid ammonia is produced by (1) transferring ammonia from a pressure tank by means of a conduit to an expansion chamber where the pressurized ammonia is converted to a mixture of gaseous ammonia and cold liquid ammonia at substantially ambient or atmospheric pressure, and then (2) separating the gaseous ammonia and the cold liquid ammonia.

3. Process as in claim 2 wherein the initial stream of cold liquid ammonia has a flow rate between about 1 and about 15 gallons per minute.

4. Process as in claim 2 wherein the liquid ammonia from the outlets is passed through a plurality of spaced conduits attached to a field cultivator and applied in a spaced pattern to the soil.

5. Process as in claim 4 wherein the liquid ammonia applied to the soil is covered immediately after application to the soil with additional soil to prevent loss of the ammonia.

6. Process as in claim 4 wherein the separated gaseous ammonia is carried by a plurality of spaced conduits and applied below the surface of the soil.

7. In a process of applying cold, liquid ammonia substantially free of gaseous ammonia at substantially atmospheric pressure to the soil comprising (1) dividing an initial stream of the cold, liquid ammonia, the initial liquid stream being carried by gravity flow by an initial conduit, into a plurality of smaller streams which are carried by a plurality of secondary conduits which conduct the liquid ammonia to spaced positions along a field cultivator, (2) then applying the smaller streams of ammonia in a spaced pattern to the soil, and (3) then covering the ammonia which has been applied to the soil with additional soil to prevent loss of ammonia to the atmosphere, the improvement comprising dividing the initial stream of ammonia into the smaller streams by directing the initial stream downward against a substantially horizontal splash plate having a flat surface, the axis of the initial stream being substantially orthogonal to the plane of the flat surface and wherein the velocity of the liquid ammonia striking the flat surface, the distance between the end of the initial conduit closest to the flat surface and the flat surface, and the shape of the end of the conduit adjacent to the flat surface are regulated such that a controlled flow of liquid ammonia is formed on the flat surface such that a controlled division of liquid ammonia is accomplished even when the position of the flat surface is varied from the horizontal position, and wherein the average diameter of the initial conduit is between about ½ and about 2 inches and wherein the distance between the end of the initial conduit and the flat surface is between about ⅛ inch and about ½ inch and wherein the initial cold liquid ammonia stream is divided into smaller streams of substantially the same flow rate.

8. Process as in claim 7 wherein the flow rate of the initial stream of cold liquid ammonia is varied between about 1 and about 15 gallons per minute while keeping the other parameters relatively constant.

9. Process as in claim 7 wherein the velocity of the initial stream is equivalent to that achieved from free fall of a distance of of least about 6 inches.

10. In a process of treating soil comprising (1) expanding a stream of pressurized liquid ammonia in an expansion chamber to form a mixture of cold liquid and cold gaseous ammonia, (2) separating the cold liquid ammonia and the cold gaseous ammonia to produce an initial gravity flow stream of cold liquid ammonia at substantially ambient or atmospheric pressure and a separate stream of cold gaseous ammonia at substantially ambient or atmospheric pressure, (3) dividing the initial cold liquid ammonia stream into a plurality of smaller separate streams, (4) applying these smaller separate stream to the soil in a spaced arrangement, and (5) then covering the liquid ammonia which has been applied to the soil with additional soil to prevent loss of ammonia into the atmosphere, the improvement comprising dividing the initial stream of cold liquid ammonia by (1) directing the initial stream downward through a substantially vertical enclosed conduit for a distance of at least about 6 inches such that substantially the entire initial stream contacts a flat surface of a splash plate and wherein the surface is in a substantially horizontal position and wherein the end of the enclosed conduit next to the flat surface is located sufficiently close to the surface and is of suitable configuration to force the liquid ammonia to form a liquid layer on the flat surface, which layer moves in a plurality of directions from the area where the liquid ammonia contacts the splash plate surface, and (2) directing the layer of liquid on the flat surface through a plurality of outlets to form said plurality of smaller streams, and wherein the flat surface and the end of the initial conduit adjacent to the flat surface are located in an enclosed chamber, and wherein the end of the conduit is in a plane essentially parallel to the plane of the flat surface and wherein the distance between the end of the conduit and the flat surface is between about $\frac{1}{8}$ to about $\frac{1}{2}$ of the average diameter of the conduit.

11. Process as in claim 10 wherein the axis of the initial conduit is positioned in a substantially orthogonal direction relative to the plane of the flat surface.

12. In a process of treating soil comprising (1) producing an initial gravity flow stream of cold liquid ammonia at substantially ambient or atmospheric pressure and a separate stream of cold gaseous ammonia at substantially ambient or atmospheric pressure by expanding pressurized liquid ammonia in an expansion chamber and then separating the liquid ammonia from the gaseous ammonia, (2) dividing the initial cold liquid ammonia stream into a plurality of separate streams, (3) applying this plurality of separate streams to the ground in a spaced arrangement, and (4) then covering the liquid ammonia which has been applied to the soil to prevent loss of ammonia to the atmosphere, the improvement wherein the initial stream of cold liquid ammonia is divided by directing the cold liquid ammonia downward by gravity flow through a substantially vertical initial conduit at least about 6 inches in length against a substantially horizontal flat surface to form a layer of liquid ammonia flowing in a plurality of directions into a plurality of conduits to form said plurality of smaller streams, and wherein the vertical initial conduit has an average diameter of between about $\frac{1}{2}$ to about 2 inches and wherein the end of the vertical initial conduit lies in a plane substantially parallel to the flat surface and is spaced a distance of between about $\frac{1}{8}$ inch and about $\frac{1}{2}$ inch from the flat surface.

13. Process as in claim 12 wherein the axis of the initial conduit is positioned in a substantially orthogonal direction relative to the plane of the flat surface.

14. Process as in claim 13 wherein the vertical initial conduit has an average diameter of about 1 inch and wherein the end of the vertical conduit closest to the flat surface is spaced about $\frac{1}{4}$ inch from the flat surface.

15. An apparatus for distributing cold liquid ammonia substantially free of gaseous ammonia at substantially ambient or atmospheric pressure comprising (1) means for directing an initial stream of the ammonia by gravity flow against a flat surface, (2) a flat surface wherein the plane of the flat surface is positioned in a generally horizontal direction and at a substantially orthogonal direction relative to the axis of the initial ammonia stream, the stream making contact with the flat surface within an enclosed chamber and in a manner such that a flow of liquid is formed on the flat surface and is effectively distributed even when tilting the flat surface by up to about 10 degrees from the horizontal position, while maintaining the direction of the axis of the stream relative to the plane of the flat surface substantially constant, and means for passing the liquid ammonia from the flat surface to a plurality of outlets to thereby cause a division of the cold, liquid ammonia, wherein the axis of the initial stream of cold liquid ammonia is substantially vertical and wherein the length of the vertical stream is at least about 6 inches, and wherein the initial cold liquid ammonia stream is carried by cylindrical conduit and the end of such conduit is in a plane essentially parallel to the plane of the flat surface and wherein the distance between the end of the cylindrical conduit and the flat surface is equal to about $\frac{1}{8}$ to about $\frac{1}{2}$ of the diameter of the cylindrical conduit.

16. Apparatus as in claim 15 additionally comprising production means for the cold liquid ammonia, such production means comprising (1) means for transferring ammonia from a pressure tank by means of a conduit to an expansion chamber, (2) an expansion chamber where the pressurized ammonia is converted to a mixture of gaseous ammonia and cold liquid ammonia at substantially ambient or atmospheric pressure, and (3) means for separating the gaseous ammonia and the cold liquid ammonia.

17. Apparatus as in claim 16 wherein the means for directing an initial stream of cold liquid ammonia has the capacity for a flow rate between about 1 and about 15 gallons per minute.

18. Apparatus as in claim 16 wherein the outlets for the liquid ammonia are connected to a plurality of spaced conduits attached to a field cultivator for applying the liquid ammonia in a spaced pattern to the soil.

19. Apparatus as in claim 18 additionally comprising means for covering with additional soil the liquid ammonia applied to the soil immediately after such application to the soil to prevent loss of the ammonia.

20. Apparatus as in claim 18 additionally comprising a plurality of spaced conduit means for carrying the separate gaseous stream of ammonia, and means for applying the gaseous ammonia below the surface of the soil.

21. In an apparatus for applying cold liquid ammonia substantially free of gaseous ammonia at substantially atmospheric pressure to the soil comprising (1) means for dividing an initial stream of the cold liquid ammonia, comprising (a) means for carrying the initial liquid stream in a downward direction by gravity flow to a plurality of secondary conduit means which conduit the liquid ammonia as separate smaller streams to spaced positions along a field cultivator, (2) means for applying the smaller streams of ammonia in a spaced pattern to the soil, and (3) means for covering the ammonia which has been applied to the soil with additional soil to prevent loss of ammonia to the atmosphere, the improvement comprising means for dividing the initial stream of ammonia into the smaller streams comprising means for directing the initial stream against a substantially horizontal flat surface means, the axis of the initial stream being substantially orthogonal to the plane of the flat surface means and wherein the velocity of the liquid ammonia striking the flat surface, the distance between the end of the initial conduit means closest to the flat surface and the flat surface, and the shape of the end of the conduit adjacent to the flat surface are regulated such that a controlled flow of liquid ammonia may be formed on the flat surface such that a controlled division of liquid ammonia may be accomplished even when the position of the flat surface means is varied from the horizontal position, wherein the average diameter of the initial conduit means is about 1 inch and wherein the distance between the end of the initial conduit means and the flat surface is between about ⅛ inch and about ½ inch, and wherein the velocity of the initial stream is equivalent to that achieved from free fall of at least about 6 inches.

22. Apparatus as in claim 21 wherein the flow rate of the means for directing an initial stream of cold liquid ammonia has the capability of being varied between about 2 and about 15 gallons per minute while keeping the other parameters relatively constant.

23. In an apparatus for treating soil comprising (1) means for producing an initial stream of cold, gravity flow liquid ammonia at substantially ambient or atmospheric pressure and a separate stream of cold gaseous ammonia at substantially ambient or atmospheric pressure comprising means for expanding pressurized liquid ammonia in an expansion chamber and means for separating the liquid ammonia from the gaseous ammonia, (2) means for dividing the initial cold liquid ammonia stream into a plurality of separate streams, (3) means for applying the plurality of separate streams to the ground in a spaced arrangement, and (4) means for covering the liquid ammonia which has been applied to the soil to prevent loss of ammonia into the atmosphere, the improvement wherein the means for dividing the initial stream of cold liquid ammonia comprises means for directing the initial cold liquid ammonia stream downward by gravity flow through a substantially vertical initial conduit means at least about 6 inches in length against a substantially horizontal flat surface means to form a layer of liquid ammonia flowing in a plurality of directions into a plurality of conduit means to form said plurality of smaller streams, and wherein the vertical initial conduit means has an average diameter of between about ½ to about 2 inches and wherein the end of the vertical initial conduit lies in a plane substantially parallel to the flat surface and is spaced between about ⅛ inch and about ½ inch from the flat surface.

24. Apparatus as in claim 23 wherein the axis of the initial conduit is positioned in a substantially orthogonal direction relative to the plane of the flat surface.

25. Apparatus as in claim 24 wherein the vertical initial conduit has an average diameter of about 1 inch and wherein the end of the vertical conduit closest to the flat surface is spaced about ¼ inch from the flat surface.

* * * * *